UNITED STATES PATENT OFFICE.

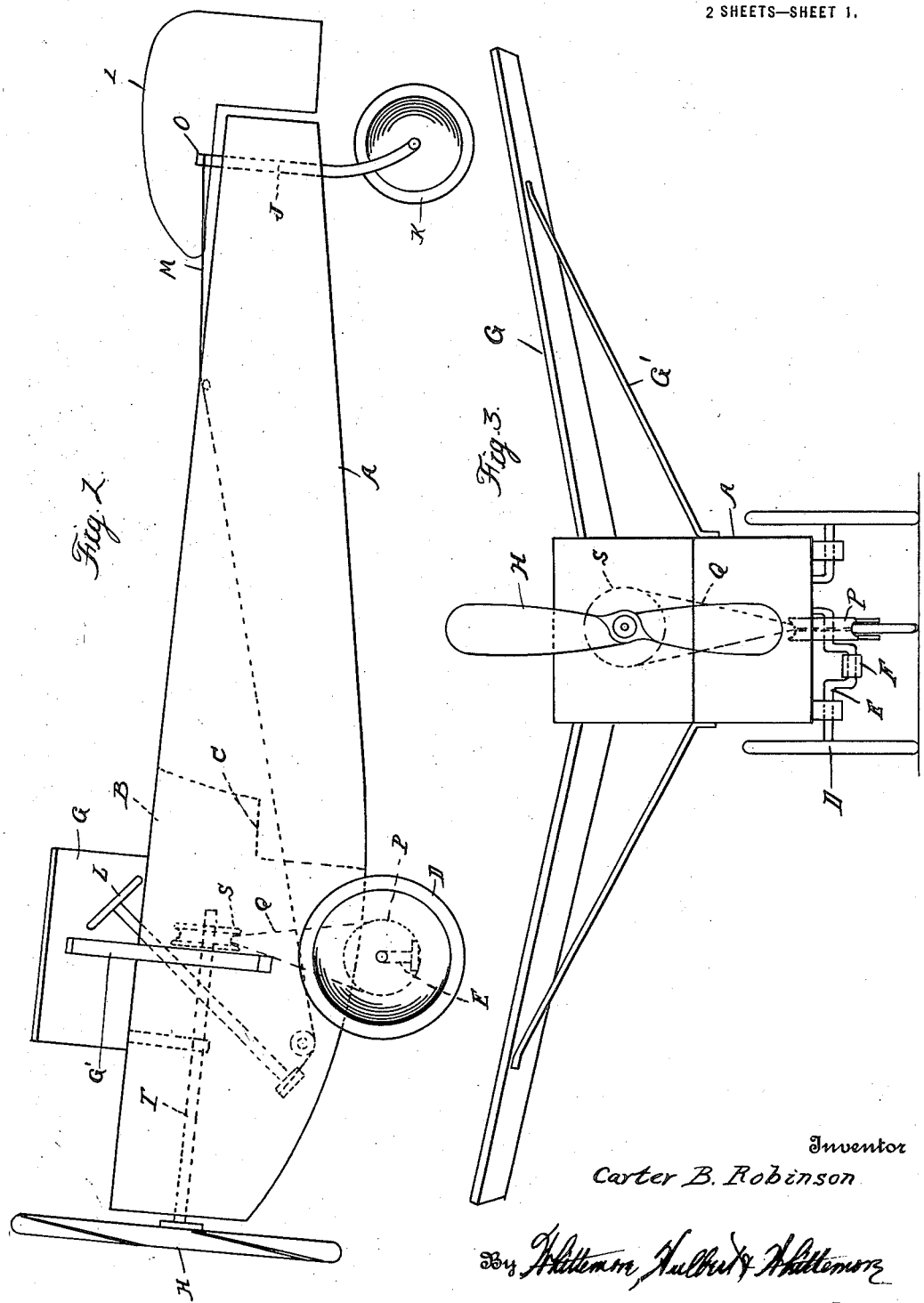

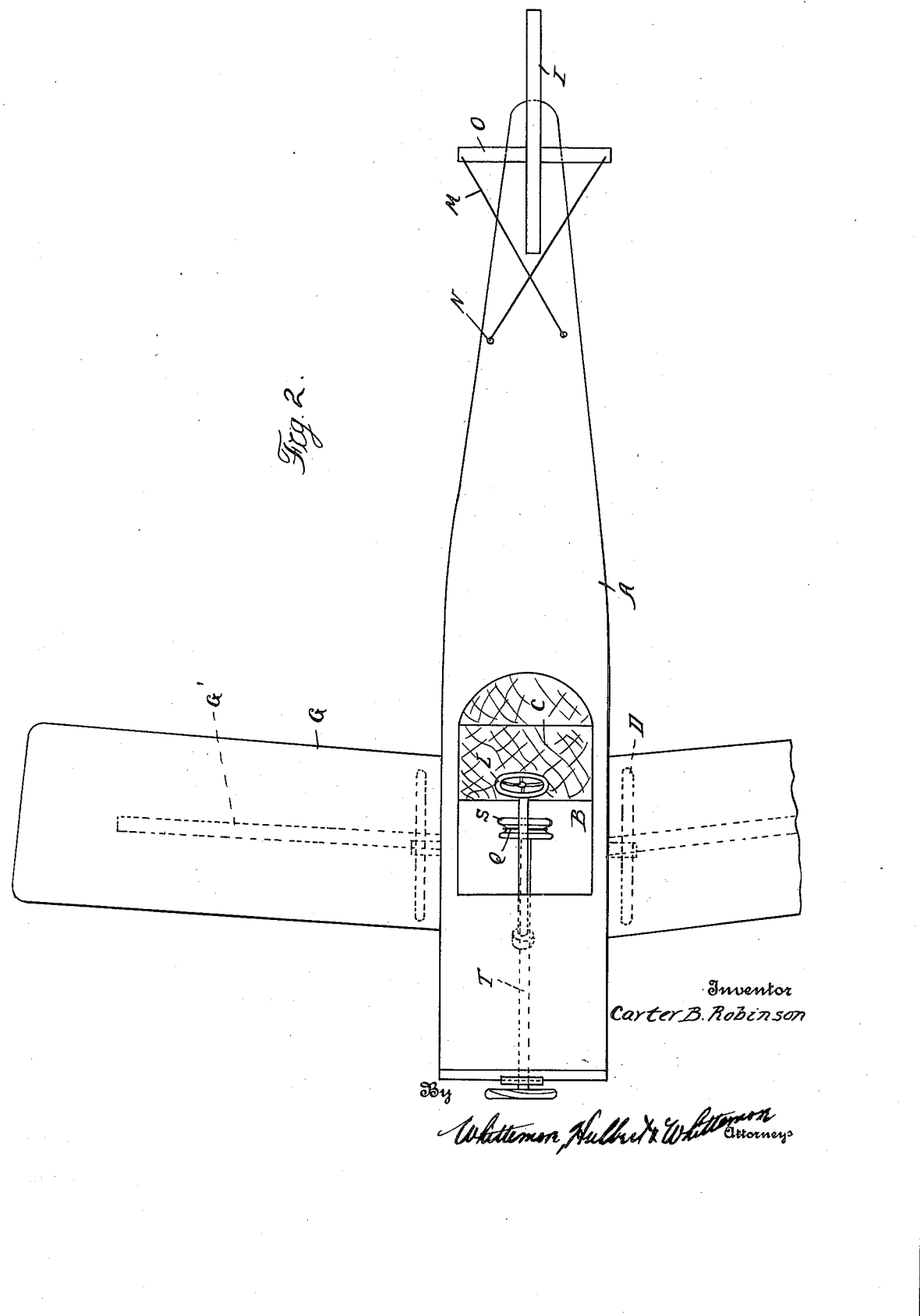

CARTER B. ROBINSON, OF WYANDOTTE, MICHIGAN.

TOY AEROPLANE.

1,402,965. Specification of Letters Patent. Patented Jan. 10, 1922.

Application filed October 27, 1919. Serial No. 333,774.

*To all whom it may concern:*

Be it known that I, CARTER B. ROBINSON, a citizen of the United States of America, residing at Wyandotte, in the county of Wayne and State of Michigan, have invented certain new and useful Improvements in Toy Aeroplanes, of which the following is a specification, reference being had therein to the accompanying drawings.

The invention relates to toys having the appearance of an aeroplane and it is the object of the invention to obtain a construction which can be propelled along the ground and steered by a child seated in the fuselage and which also communicates rotary motion to the tractor or propeller. To this end the invention consists in the construction as hereinafter set forth.

In the drawings:

Figure 1 is a side elevation;
Figure 2 is a plan view;
Figure 3 is a end elevation.

A is the body or fuselage, which may be formed of any suitable light material and which is provided in its front portion with the cockpit B, containing a seat C. The fuselage is supported upon wheels D which are arranged to have the appearance of a landing gear of an aeroplane and these wheels are mounted upon a crank shaft E provided with pedals F, which may be operated by the occupant of the seat. On opposite sides of the fuselage are the wing members G which are formed to represent either a monoplane or a biplane, these as shown being supported by brace members G'. At the rear of the fuselage is a rudder member I, which is mounted upon the stem J of a steering wheel K. The rudder is turned by operating connections from a controlling wheel L arranged in the cockpit in front of the occupant. The operating connections, as shown, are flexible cords or wires M which pass through the fuselage and out through apertures N therein and are then crossed and connected to laterally-extending posts O on the rudder. The tractor H is driven by the rotation of the wheels D through suitable mechanism, such as the pulley P on the shaft E connected by the belt Q to the pulley S on the shaft T of the tractor.

In use, the child sitting upon the seat C in the cockpit can propel the device by manipulation of the pedals and can steer by the wheel L. Whenever the plane is moving forward, the revolution of the shaft E will communicate rotary motion to the shaft T through the connections described and thus by rotating the tractor H, will make the latter appear as the propelling means.

What I claim as my invention is:

1. A toy aeroplane, comprising a fuselage body having a cockpit therein and a seat within said cockpit, wings projecting laterally from said body, a rudder member in rear of the fuselage, supporting wheels for the fuselage, pedals for turning the forward wheels operable by the occupant of the cockpit, a tractor mounted at the forward end of the fuselage, a driving connection between the forward supporting wheels and said tractor for rotating the latter when the device is moving, a steering wheel operable by the occupant of the cockpit, connections between said steering wheel and the rudder, and a ground steering wheel connected with the rudder and operated therefrom.

2. A toy aeroplane, comprising a fuselage body having a cockpit and a seat therein, wings projecting laterally from said body, a rudder member at the rear of said body, a wheel support for said body including forward wheels and a crank shaft on which said wheels are mounted, pedals for operating said crank shaft by the occupant of the cockpit, a pulley on said crank shaft, a tractor rotatively mounted at the forward end of the fuselage, a pulley connected with said tractor, a flexible driving connection between the pulley on the crank shaft and the pulley on the tractor, a steering wheel operable by the occupant of the cockpit, connections between said steering wheel and said rudder, and a rear supporting wheel connected with said rudder.

In testimony whereof I affix my signature.

CARTER B. ROBINSON.